April 14, 1936.    F. R. NELSON    2,037,260
STOKER
Filed Feb. 7, 1935
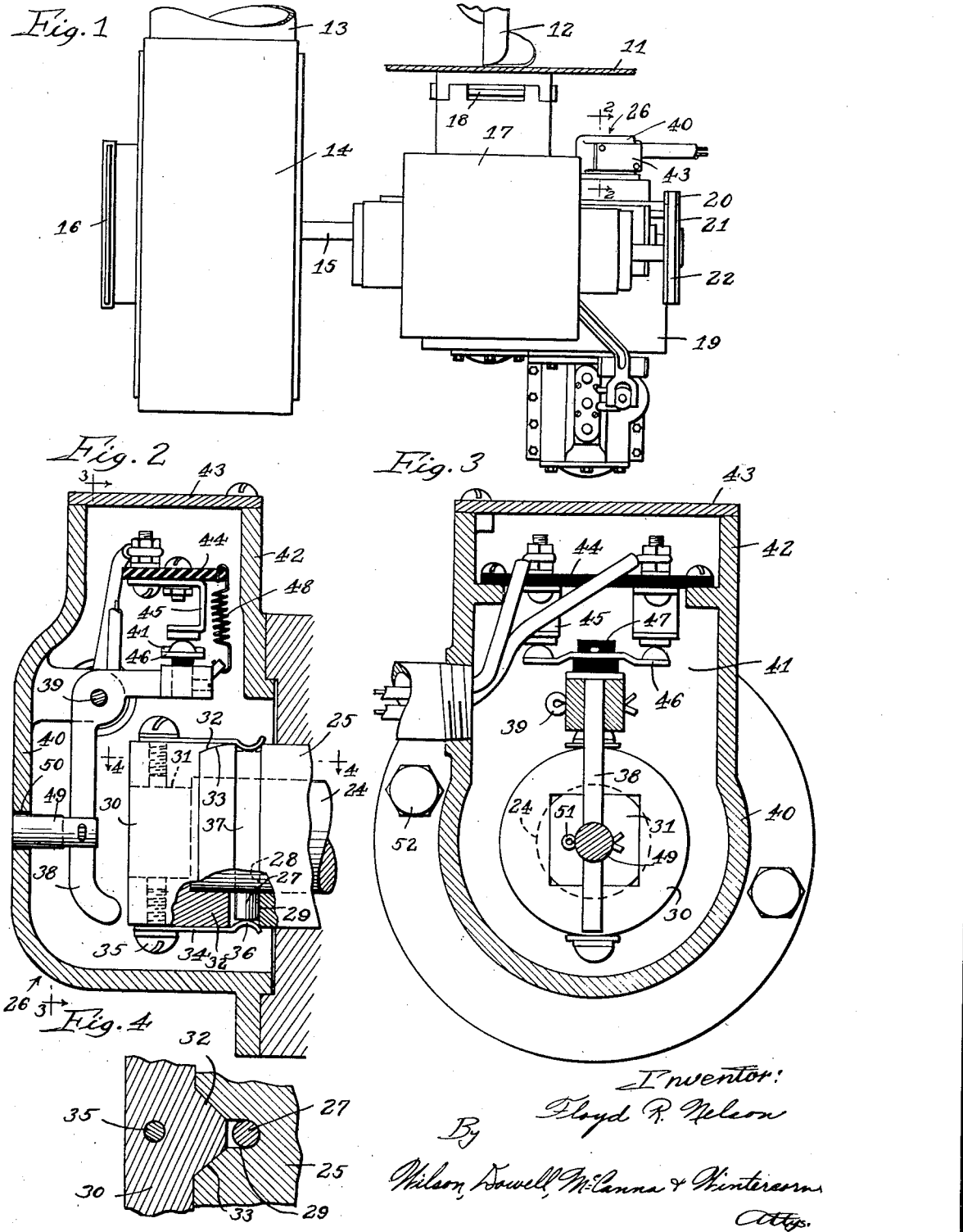

Patented Apr. 14, 1936

2,037,260

UNITED STATES PATENT OFFICE 2,037,260

STOKER

Floyd R. Nelson, Rockford, Ill., assignor to Cotta Transmission Corporation, Rockford, Ill., a corporation of Illinois Application February 7, 1935, Serial No. 5,383

7 Claims. (Cl. 192—150)

This invention relates to stokers, and has for its principal object the provision of an overload release mechanism arranged in the event of excessive resistance to the turning of the stoker feed screw to operate a switch and break the circuit of the electric motor, besides disconnecting the screw from the transmission.

Another object of this invention is to provide certain improvements on the mechanism disclosed in my earlier application, Serial No. 585,739, filed January 9, 1932.

In the accompanying drawing—

Figure 1 is a plan view of the drive end of a stoker embodying the overload release mechanism of my invention;

Fig. 2 is a longitudinal vertical section through said mechanism taken on the line 2—2 of Figure 1;

Fig. 3 is a cross-section on the line 3—3 of Fig. 2, and

Fig. 4 is a sectional detail on the line 4—4 of Fig. 2.

The same reference numerals are applied to corresponding parts throughout the views.

The invention is herein illustrated as applied to a stoker of the under-feed type utilizing a feed screw, but it will soon be evident that the invention is adaptable for use with other stokers and for that matter any machine on which similar features are desirable. Referring to Figure 1, the numeral 11 is applied to a portion of the hopper from which the coal is fed by the screw 12 through a suitable conduit extending forwardly from the hopper to a point under the grates of the furnace, hot water heater, or boiler. Air to support combustion is also delivered to the furnace through an air duct 13 extending forwardly from the blower 14. The rotor of the blower is operated by a shaft 15 at a constant speed, so that a shutter 16 has to be provided for the air inlet to regulate the delivery of air according to the fuel delivery. A constant speed electric motor 17 furnishes the power for driving the screw 12 and blower 14, and is hingedly mounted on the base of the hopper 11, as shown at 18, above the housing 19 of the transmission. A spring (not shown) acts against the top of the housing 19 to raise the motor 17 to keep the belt 22 under proper tension. The shaft 15 previously referred to extends through suitable bearings in the housing 19 and has a pulley 20 on the projecting end thereof directly below the pulley 21 provided on the armature shaft of the motor 17, and the belt 22 provides a driving connection between these pulleys. This accounts for the constant speed drive of the blower. A worm (not shown) is provided on the shaft 15 in the housing 19 and meshes with a worm gear in the housing to provide a reduction driving connection between the motor and the transmission.

The transmission may be of any suitable or preferred type. It may, for example, be like the one disclosed in my earlier application, in which event the shaft 24, Fig. 2, is the counter-shaft disposed in parallel relation to and having a gearing connection with the shaft coupled to the end of the feed screw 12, and 25 is the end of the hub portion of the driven gear or pinion on the counter-shaft through which the drive is transmitted to the feed screw shaft. The hub or sleeve portion 25 is normally fixed to the end of the shaft 24 by means of the overload release mechanism of my invention, indicated generally by the numeral 26.

The overload release mechanism 26 is clearly illustrated in Figs. 2 and 3 and, as just stated, provides a releasable driving connection between the shaft 24 and sleeve or hub 25, the release being contingent upon excessive resistance to turning of the screw 12. Such resistance may result from any one of several causes and, in the case of a stoker, the most common cause is a jam resulting from a railway spike or large stone in the coal, which, upon arrival at the bottom of the hopper, gets stuck and prevents turning of the screw. The mechanism 26 is, furthermore, arranged to break the circuit for the motor 17 at the same time that the drive for the feed screw is disconnected. A shear pin 27 is entered through registering holes 28 and 29 in the shaft 24 and sleeve 25, respectively, and its cross-section is such that anything beyond a predetermined resistance to turning of the screw 12 will result in the ends of the pin shearing off and allowing the shaft 24 to turn relative to the sleeve 25. A collar 30 has a square hole therein to receive the squared end 31 of the shaft 24 with a working fit. V-shaped cam projections 32 are provided on the collar 30 on diametrically opposite sides to fit in complementary notches 33 provided in the end of the sleeve 25. The notches 33 are in the same plane with the holes 29 and communicate therewith, as clearly appears in Fig. 4. This is to facilitate dislodging the broken off ends of the shear pin 27, these pieces being easily removed through the notches when the collar 30 is backed away from the end of the sleeve 25, as will soon appear. Leaf springs 34, fastened at one end to the collar 30, as by screws 35, have their other ends formed arcuate, as at 36, and arranged to enter an annular groove 37 provided therefor in the sleeve 25, whereby to hold the collar 30 normally in the position shown in Fig. 2, with the projections 32 fitting in the notches 33. The ends 36 of the springs 34 must be spread apart slightly to ride over the end of the sleeve 25, and will, therefore, snap into the groove 37 when the projections 32 are entered fully in the notches 33. The holes 29 occur in the groove 37 and in line with the springs 34 so that the ends 36 of these springs serve by engagement with the ends of the pin 27 to prevent accidental displacement of the pin. In other words, the springs 34 serve a double function—they retain the collar 30 in its normal position, resisting endwise displacement, and they retain the shear pin against endwise displacement.

In operation, when the pin 27 shears off and the shaft 24 turns with respect to the sleeve 25, the collar 30 is cammed away from the end of the sleeve 25 by reason of the lateral movement of the projections 32 with respect to the notches 33. The resistance offered by the springs 34 is, of course, easily overcome and the collar slides on the squared end 31 of the shaft into engagement with the bell-crank lever 38 that is pivoted at 39 in the housing 40, which, in turn, is suitably secured to the transmission housing and forms an enclosure for the overload release mechanism. The lever 38 operates a switch 41 to open the circuit of the motor 17. While, of course, any suitable or preferred form of switch may be used, the switch herein shown is of a simple, compact and serviceable type housed within the open extension 42 of the housing 40 and readily accessible upon removal of the cover plate 43. Briefly stated, it comprises a cross-piece 44 of insulation material carrying a pair of terminals 45 through which a circuit will be completed when the blade 46, loosely mounted on the holder 47, is brought into contact therewith. The holder 47 is of insulation material whereby to insulate the blade 46 from the lever 38. A spring 48, acting between the cross-piece 44 and the end of the lever 38, normally urges the lever in a counter-clockwise direction, as viewed in Fig. 2, to keep the blade 46 in firm engagement with the terminals 45 and, of course, since the blade is loosely mounted intermediate its ends, as stated, there is definite assurance of firm engagement with both terminals. The movement of the collar 30 is sufficient to swing the lever 38 far enough in a clockwise direction to open the motor circuit and, of course, once the collar has been forced out of its normal position, it remains so until the shear pin is replaced and the collar reassembled in the position previously described. An indicating plunger 49 is slidable in a hole 50 in the end wall of the housing 40 and pivotally connected to the lever 38 by a cotter pin 51, and in its normal position (Fig. 2) has the end thereof substantially flush with the outside of the housing. However, when the pin 27 is sheared and the collar 30 moves the lever 38 to open the motor circuit, as just described, the plunger 49 is moved by the lever so that it projects from the housing and thereby serves to indicate to the operator at a glance why the stoker has stopped. The operator will, therefore, know that an obstruction must be removed from the screw 12 and the shear pin must be replaced before normal operation can be resumed. The housing 40 is preferably fastened in place with only two screws 52 so that it can be quickly removed when the shear pin has to be replaced.

I claim:

1. An overload release mechanism comprising a driving member, a driven member, a shear pin normally connecting said driving and driven members to rotate together, a control member non-rotatably mounted on one of said driving and driven members and slidable endwise with respect thereto, said control member having a V-shaped cam projection and the other of said driving and driven members having a V-shaped notch normally receiving said projection, one or more leaf springs on the control member arranged to engage a recessed portion provided on the notched member to retain the projection yieldingly engaged in the notch, said control member being normally stationary with respect to the notched member but arranged to move endwise with respect thereto by cam action of the projection in the notch upon relative rotation between the driving and driven members resulting from shearing of the shear pin, and means operable in endwise movement of said control member for operating a device to be operated.

2. A mechanism as set forth in claim 1 wherein the driving and driven members are disposed in telescoping relation and the shear pin extends diametrically through registering holes provided in said members, and wherein the holes are so located whereby the ends of the pin are overlapped by portions of the leaf springs to prevent endwise displacement of the pin.

3. An overload release mechanism for a power transmission comprising in combination with a shaft and a sleeve on said shaft, one of said shaft and sleeve elements being the driving element and the other the driven element, a shear pin connecting the shaft and sleeve to rotate together, a collar mounted on said shaft to turn therewith and be slidable with respect thereto, said collar having diametrically opposed V-shaped cam projections, said sleeve having diametrically opposed V-shaped notches provided in the end thereof normally receiving said projections, said projections being arranged in the event of relative rotation between the shaft and sleeve, resulting from shearing of the pin, to cause endwise movement of said collar by cam action of the projections in the notches, and a pair of leaf springs mounted on said collar in diametrically opposed relation and frictionally engaging the end of said sleeve to resist endwise movement of said collar, said springs being so disposed with respect to the ends of the shear pin to prevent endwise displacement thereof.

4. An overload release mechanism for a power transmission comprising in combination with a shaft and a sleeve on said shaft, one of said shaft and sleeve elements being the driving element and the other the driven element, a shear pin connecting the shaft and sleeve to rotate together, a collar mounted on said shaft to turn therewith and be slidable with respect thereto, said collar having diametrically opposed V-shaped cam projections, said sleeve having diametrically opposed V-shaped notches provided in the end thereof normally receiving said projections, said projections being arranged in the event of relative rotation between the shaft and sleeve, resulting from shearing of the pin, to cause endwise movement of said collar by cam action of the projections in the notches, said sleeve having an external annular groove provided therein in the same plane with the shear pin so that the ends of the pin are accessible in the groove, and a pair of leaf springs on said collar having bent ends arranged to ride frictionally over the end of the sleeve and snap into said groove to resist endwise displacement of the collar relative to the sleeve, said springs being so disposed with respect to said pin to prevent endwise displacement thereof.

5. In an overload release mechanism, the combination of a power transmission housing having a shaft projecting therefrom with a sleeve thereon, one of said shaft and sleeve elements being a driving element and the other a driven element, a shear pin connecting the projecting ends of said shaft and sleeve to rotate together, a housing detachably secured to the first housing enclosing the projecting ends of said shaft and sleeve, a switch in said second housing to be operated in the event of shearing of said pin, a lever pivotally mounted in the second housing and operatively connected with the switch to operate the same in pivotal movement of the lever, a collar slidably and non-rotatably mounted on the end of said shaft normally in retracted relation to said lever but arranged to communicate pivotal movement thereto in the sliding movement of the collar, said collar having a V-shaped cam projection and said sleeve having a V-shaped notch normally receiving said projection, said projection being arranged in the event of relative rotation between the shaft and sleeve, resulting from shearing of the pin, to cause sliding movement of said collar by cam action of the projection in the notch, and an indicator plunger slidable in an opening provided therefor in the wall of the second housing and pivotally connected with the switch operating lever, said plunger being normally disposed in a retracted position but arranged in the pivotal movement of said lever to be moved to an extended position, whereby to indicate that the switch has been operated.

6. In an overload release mechanism comprising driving and driven members, one of which is a shaft and the other of which is a sleeve in telescoping relation with the shaft, a collar slidable on the shaft but non-rotatable with respect thereto, means providing a detachable driving connection between the collar and sleeve comprising a V-shaped cam projection on one of said parts received in a V-shaped notch provided in the other part, diametrically disposed leaf springs on said collar frictionally engaging the periphery of the adjacent end of the sleeve to hold the collar releasably in operative relation to the sleeve, and a shear pin extending diametrically through registering holes provided in the end of the sleeve and shaft to provide a driving connection therebetween, said pins being disposed so that the aforesaid leaf springs prevent displacement of the pin from said registering holes so long as the collar is in its normal operative position.

7. A mechanism as set forth in claim 6 wherein the sleeve has an annular groove provided therein in the same plane with the diametric hole therein and wherein the ends of the leaf springs are formed to provide offset portions to engage in said groove.

FLOYD R. NELSON.